United States Patent [19]

DeVries et al.

[11] Patent Number: 5,617,221

[45] Date of Patent: Apr. 1, 1997

[54] FACSIMILE MODEM FOR PASSING IMAGE INFORMATION TO A FACSIMILE MACHINE AND COMPUTER

[76] Inventors: Hans DeVries, 117-119, Schoolstraat, Voorschoten, Netherlands; Suresh Ramamurthi, P.O. Box 9436, Lyndhurst, N.J. 07071

[21] Appl. No.: 148,072

[22] Filed: Nov. 4, 1993

[51] Int. Cl.⁶ .................................................. H04N 1/32
[52] U.S. Cl. .............................................. 358/442; 379/93
[58] Field of Search ...................... 358/406, 402, 358/403, 407, 434, 442, 444, 468; 379/93, 94, 100, 34, 35

[56] References Cited

U.S. PATENT DOCUMENTS

| | | | |
|---|---|---|---|
| 4,964,154 | 10/1990 | Shimotono | 358/442 |
| 5,103,318 | 4/1992 | Takaoka | 358/444 |
| 5,163,088 | 11/1992 | Locascio | 358/442 |
| 5,175,762 | 12/1992 | Kochis et al. | 379/100 |
| 5,182,762 | 1/1993 | Shirai et al. | 375/222 |

*Primary Examiner*—Scott A. Rogers
*Attorney, Agent, or Firm*—Meltzer, Lippe, Goldstein, et al.

[57] ABSTRACT

A faxmodem apparatus and method of operating the faxmodem passively logs fax transmissions to and from a facsimile apparatus connected through the modem. The apparatus can convert any facsimile signal into an electronic copy, even non-standard format transmissions. This device allows the use of existing fax machines to send and receive, yet provide an electronic copy of the faxes automatically for further use on a computer or network.

17 Claims, 5 Drawing Sheets

FACSIMILE MODEM FOR PASSING IMAGE INFORMATION TO A FACSIMILE MACHINE AND COMPUTER

BACKGROUND OF THE INVENTION

1. Field of the Invention

The present invention relates to a facsimile modem (faxmodem) device and, more particularly, to a faxmodem for monitoring and recording facsimile transmissions passing through the device to or from a conventional facsimile machine, and for transmitting and receiving facsimile and data information.

2. Description of the Prior An

Faxmodem cards are becoming increasingly powerful components to personal computers (PCs) and networked (or LAN) computer systems. Faxmodem cards facilitate sending data and facsimile information from a computer to either another computer or a facsimile machine. Faxmodem cards do not, however, send non-electronic data, such as an image on paper directly to a facsimile machine. Rather, a scanner or interface device is required, such as described in U.S. Pat. No. 4,964,154 to Shimotono. The contents of this patent are incorporated herein by reference.

However, particularly with the emergence of networks and network fax servers, there is a need to retain electronic copies of incoming and outgoing faxes (including those having image information) without having to perform manually separate and additional scanning, storing, or printing steps. Many users pre/r electronic copies because of the ease with which computers can search, alter, and rebroadcast electronic copies. Hard copies are often preferred for reading and mailing. This preference for electronic and hard copies, depending on the situation, imposes certain inconveniences on current faxmodem users. Ordinarily, faxes sent or received from a conventional facsimile (fax) machine must be scanned into a computer in order to have an electronic copy stored in the computer. Faxes sent to or received by a computer using a faxmodem have to be sent to a printer attached to the computer to obtain a hard copy.

Current solutions to these inconveniences include directing to a computer printer all electronic copies received by a faxmodem so that hard copies are created; and scanning all received faxes sent or received by a conventional facsimile machine, so electronic copies are created. These additional steps are typically inconvenient and time consuming. Moreover, these solutions require an additional investment in hardware. For example, having a hard copy of every facsimile message sent and received from a computer requires an additional investment in a printer. Making electronic copies of conventional faxes requires a scanner. Also, a scanner is needed to send non-electronic messages (image information) through the faxmodem. The solution is made more difficult because a receiving facsimile or faxmodem instructs the transmitting fax machine what modulation and coding formats it accepts. If two machines of the same manufacturer are communicating, these may be non-standard formats unique to that manufacturer. A device which can make electronic copies of all incoming and outgoing faxes must be able to determine the modulation and coding formats used and be able to demodulate and decode them, even if they are non-standard.

Certain prior art devices directed to facsimile machines and computers do not solve these inconveniences. The device disclosed in the '154 patent to Shimotono is a communication adapter device for use with a fax machine and a computer. This adapter device connects either a computer modem or fax machine to a telephone line depending on the information being transmitted or received. In order to send information from the local fax to the local computer or vice versa, the Shimotono device must generate a telephone ring as if the receiving device was receiving information from a remote device. Also, the adaptor connects only one of the two devices to the telephone line. The device does have a "monitoring" capability wherein the computer monitors the communication state of the fax machine. However, no image information transmitted by or received from the fax machine is sent to the computer. Thus, this device does not overcome the above-mentioned problems and inconveniences.

U.S. Pat. No. 5,163,088 to LoCascio discloses a facsimile security system. This system purports to record all transmitted and received information onto a "write once, read many" storage system to allow review of the information for security. The facsimile information is received by a central processing unit and then directed to the appropriate location (e.g, fax or faxmodem). It does not allow an electronic copy to be made simultaneously as the fax is received or transmitted. Moreover, the computer will not allow alterations to information stored on the "write once, read many" memory. Finally, this fax device does not address practical problems involved with receiving facsimile and data information, such as demodulating and decoding the information, particularly if it is a Non-Standard Specification (NSS).

SUMMARY OF THE INVENTION

The present invention solves the problems and inconveniences currently facing the fax and faxmodem users by incorporating into a faxmodem the ability to monitor and record electronic copies of all fax transmissions and receptions, preferably in real time. The recorded fax message may then be processed, altered, archived, rebroadcast and/or sent to wireless devices such as pagers and cellular phones.

These objectives are obtained by a faxmodem device connected between a telephone line and a fax machine having a high impedance transformer for receiving a facsimile transmission without affecting the transmission. The device has facsimile processing means connected to the high-impedance means for demodulating the sample signal and decoding it in order to produce a fax image information, and output means for transmitting a fax image information to a personal computer. Preferably, the device also operates as a conventional faxmodem.

BRIEF DESCRIPTION OF THE DRAWINGS

The foregoing and other features of the present invention will be more readily apparent from the following detailed description and drawings of an illustrative embodiment of the invention in which:

FIG. 2 is a flow chart describing the operation of a faxmodem device according to the present invention when a local fax machine is receiving or sending fax information.

A DETAILED DESCRIPTION OF A PREFERRED EMBODIMENT

Figure 1:
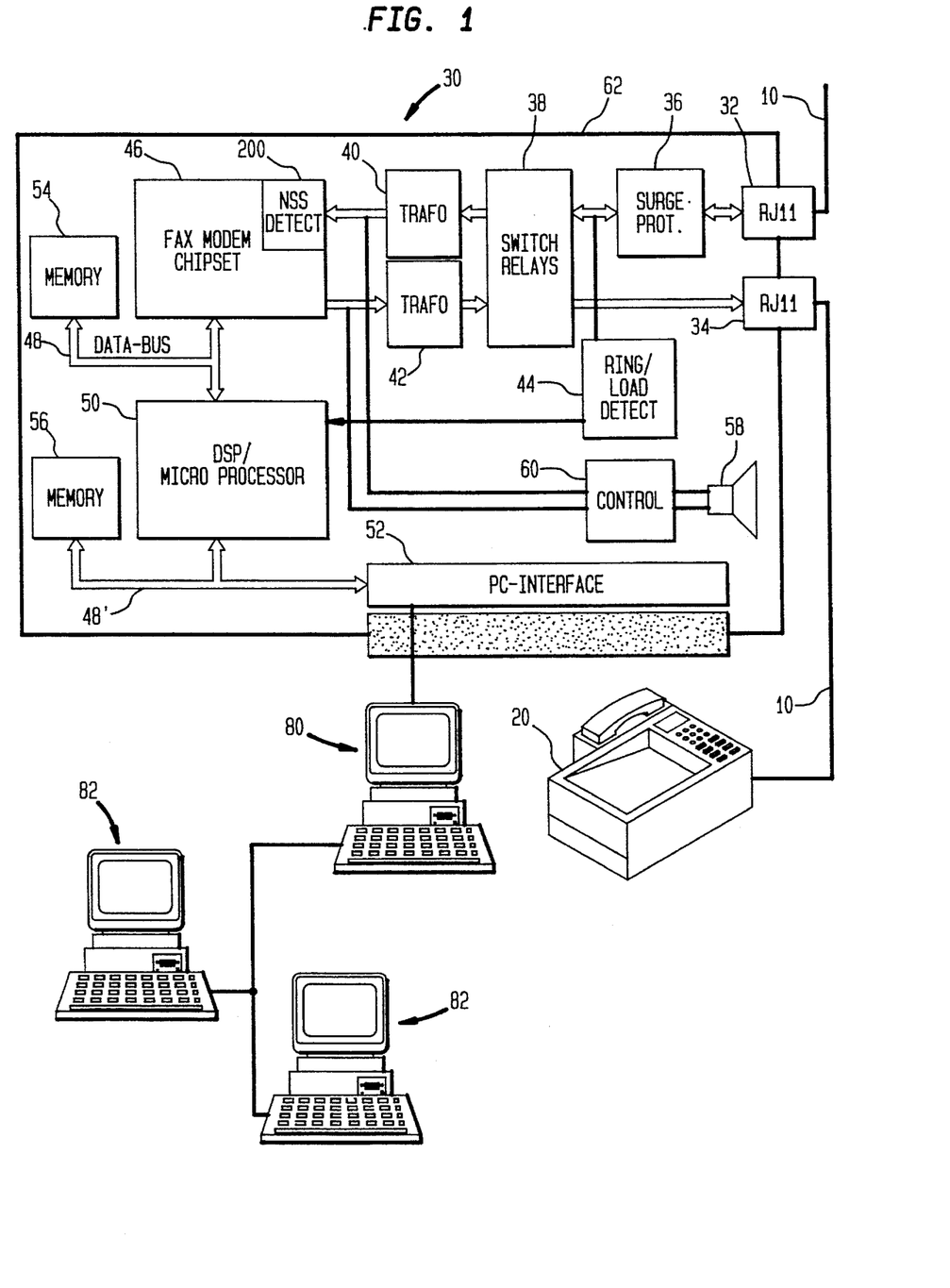
FIG. 1 is a block diagram of one embodiment of a faxmodem according to the present invention.

FIG. 1 is a block diagram showing one embodiment of a faxmodem device 30 according to the present invention. This preferred embodiment of the faxmodem device 30 of the present invention operates in two different modes. In the normal mode, the faxmodem 30 monitors and actively logs the incoming and outgoing fax messages of a conventional local fax machine 20. In the second mode, the faxmodem functions as a standard fax/data modem which sends and receives faxes and digital data. The operation of a standard fax/data modem is well known and is described, for example, in U.S. Pat. No. 5,065,427 to Godbole, the text of which is incorporated herein by reference.

As shown in FIG. 1, a telephone line 10 and a fax machine 20 are connected to device 30 through two connectors 32, 34. Within device 30 the first connector 32 is connected to a conventional surge protector 36. This surge protector 36 protects the faxmodem 30 and the computer from voltage surges which may occur on the telephone line 10. The surge protector 36 is connected to a switch 38. The switch 38 is preferably a digital switching relay bank, but may be any suitable switch. In its normal mode of operation, switch 38 connects the first and second connectors 32, 34 together so the fax machine is connected to the telephone line. This allows the fax machine to send and receive fax messages. In this second mode, the switch 38 disconnects the second connector 34, thus disconnecting the fax machine 20 from the telephone line 10.

The switch 38 is connected to two transformers 40, 42. The first transformer 40 has a high impedance, preferably on the order of 50 kΩ, and the second transformer 42 has a standard telephone line impedance, approximately 600 Ω. The high impedance transformer 40 is used by the faxmodem 30 to monitor conventional fax machine communications (reception or transmission) and to operate as a conventional faxmodem device. The high impedance transformer 40 is used in the normal mode (monitoring) so that the faxmodem device may receive the fax image information without interfering with the ordinary fax transmission between the local and remote fax machines. That is, only a small percentage of the transmitted signal is diverted to the faxmodem due to the transformer's very high impedance. In a preferred embodiment, this transformer has a ratio of 6:1. The low impedance transformer 42 is a standard 600 Ω telephone transformer and is used for transmitting data and fax information from the fax modem 30 to the telephone line when operating in the second mode as a conventional faxmodem.

A ring and load detector 44 connected to the lines between the surge protector 36 and switch relays 38. The ring and load detector 44 detects ring signals or line current on the telephone line 10. The ring and load detector 44 informs a digital signal processor (DSP) 50 in device 30 when a ring or load is detected so that the DSP will take the appropriate actions.

The line transformers 40, 42 provide an interface between the telephone line 10 and a faxmodem chip set 46. The faxmodem chip set 46 may be any commercially available fax modem chip set. One such chip set is available from Rockwell comprised of a single chip which has a DSP and an analog front end and is sold under the trade name 96 DFX. However, many other suitable faxmodem chip sets are commercially available. The faxmodem chip set 46 has built-in functions for modulation/demodulation, data compression/decompression, error correction, and other functions well known to those skilled in the art. Also, the faxmodem chip set is adjusted in a manner known to one skilled in the art so it can process low current fax and data which has been received from the high impedance transformer 40, for instance by amplifying the signal received from the transformer 40.

In the first or fax monitoring mode, the reception side of the faxmodem chip set is used. In this mode, the local fax machine 20 is either sending or receiving a fax message. The faxmodem 30 receives the analog signals from the telephone line 10 through the first connector 32. Most of the analog signal is transmitted along the telephone line 10 between the local fax machine 20 and a remote fax device. However, a small percentage of the signal current is directed through the surge protector 36 and is switched through the high impedance transformer 40 to the faxmodem chip set 46. The faxmodem chip set receives the analog signals, preferably in real time, demodulates them and converts them into digital data. The digital data is sent from the faxmodem chip set 46 to the digital signal processor (DSP) 50 via the data bus 48.

Figure 3:
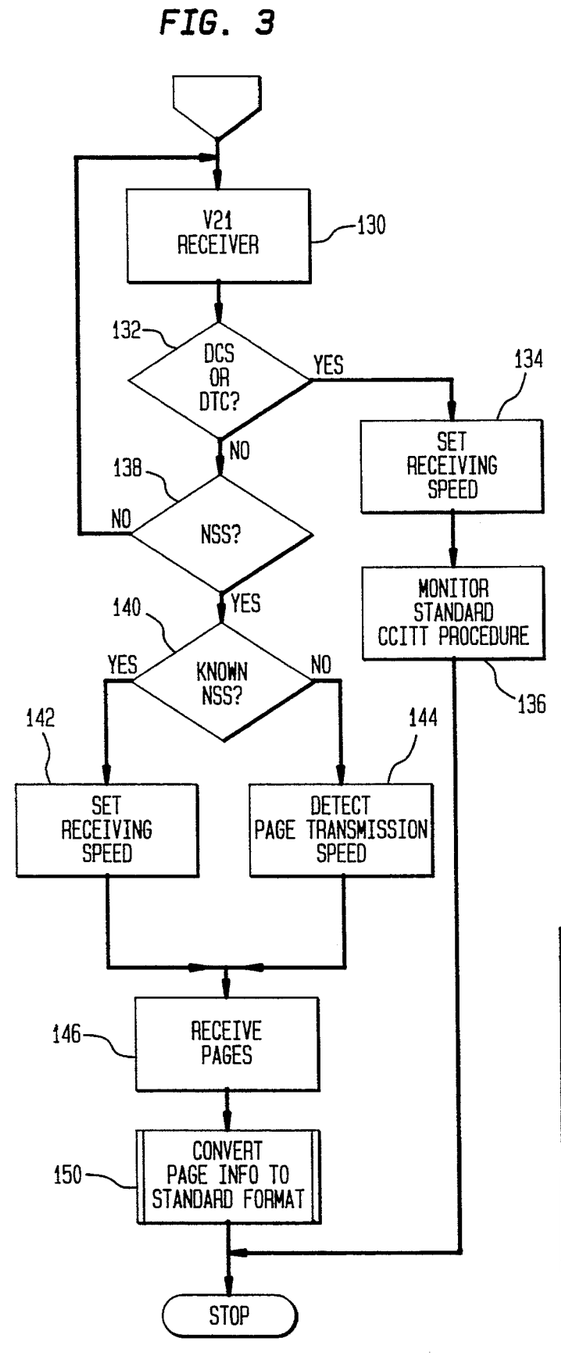
FIG. 3 is a flow chart showing the operation of the faxmodem in demodulating and recording a transmitted or received facsimile transmission.
Figure 4:
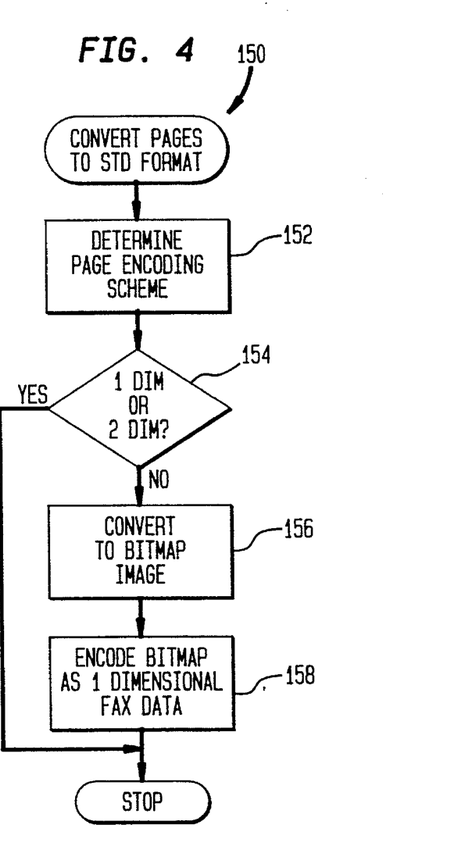
FIG. 4 is a flow chart showing the operation of the faxmodem when converting demodulated fax information into standard fax form.

The DSP 50 controls the faxmodem card operation according to instructions from software in a program memory 56 such as a flash EPROM, which is connected to DSP by bus 48'. These instructions (a flow chart of which is shown in FIGS. 2, 3, and 4) are applied to the data received by the faxmodem. In the monitoring mode, the entire transmission (either to or from the local fax machine 20) is received and demodulated by the faxmodem chip set 46 and sent to the DSP 50. When a fax transmission is initiated, the fax machines exchange a digital handshake which includes information from the receiving fax machine about the modulation technique and data encoding to be used for the transmission. In the monitoring mode, the DSP 50 sets the fax modem chip set 46 to receive the handshake information. If standard modulation techniques and encoding formats are to be used, the received handshake information tells the DSP 50 what these techniques and formats are and sets the faxmodem chip to the correct demodulation techniques and decoding formats. However, if the two communicating fax machines are made by the same manufacturer, the machines may convert to a non-standard proprietary handshake which allows the data transmission options to be non-standard specifications as permitted by CCITT G.3 recommendations. In this case, the DSP 50 sets the faxmodem 30 to a previously programmed default modulation technique and uses the demodulator information of the faxmodem chip set 46 to determine demodulation speed and protocol and seeks a match from a library of predetermined information of the non-standard formats used by particular manufacturers. If the format matches, the DSP 50 sets the faxmodem chip set 46 to the known manufacturer's demodulation technique. If the formats do not match known non-standard formats, a "best fit" is found and this technique is used.

After the handshake, the page data is received by the DSP 50 and sent to computer or network server 80 via the PC interface 52, thus simulating a fax received by the faxmodem device 30. The PC interface 52 may be a serial port if the faxmodem 30 is an external device; or the interface 52 may be an internal connection which operates as a serial port if the faxmodem is a card. FIG. 1 shows the faxmodem as a card with components mounted on an expansion board 62.

If the page data is encoded as a non-standard fax message, the DSP 50 converts the page data into a standard one dimensional coded fax message before sending it to the computer. This is done by converting the non-standard message into a full bit map, and changing the corresponding compression formats. This may be done a few lines at a time (ten lines, for example) in order to save memory space. By sending the data over bus 48' from DSP to memory 54, memory 54 may be used for temporary storage during this conversion process.

The memory chips 54, 56 are used both as buffers for the data buses 48, 48' and for data storage during fax conversion from non-standard to standard fax messages, as described above. The program memory 56 stores the DSP program, the algorithms for a non-standard fax conversion and the library, for detecting modulation techniques. Preferably, the program memory 56 is a flash EPROM which allows for easy software updates. As is well known with flash EPROMS, the faxmodem can communicate with another computer and download a program update to the flash EPROM's programmed memory and automatically reprogram itself. Although a flash EPROM is preferred, any appropriate memory device may be used. Alternatively, the DSP 50 may have both program memory and temporary memory. For example, Texas Instruments manufactures a DSP under the trade name 32XX, which has both program and temporary memory space.

The computer or network server 80 receives the data from interface 52, and handles it as it would any fax message. For example, the computer may use conventional, well-known methods to convert the fax message into text which may be displayed on a screen, stored in memory, sent to a paging network, convened into a voice signal and relayed over either a wired or wireless communication system, distributed to network work stations 82, or E-mail, or any other well known use for fax information.

In a second mode, the fax/data mode, the faxmodem device may operate as a normal fax/data modem including sending and receiving fax and data transmissions. This function includes sending faxes generated in the computer to another faxmodem or fax machine, receiving faxes from another fax modem or machine, either when the fax machine does not answer or when the normal monitoring mode is switched off. The faxmodem also has an audio speaker 58 which allows the operator to monitor phone call progress. The speaker volume control 60 may be adjusted by the chip set 46 according to the computer software used with the faxmodem. The faxmodem card may be controlled using EIA/TIA Class II fax/data modem commands by any standard PC fax software available on the market such as Quick Link or Smartcom.

FIG. 2 is a flow chart showing the operation of a faxmodem according to the present invention when the local fax machine is receiving or sending a message, or the faxmodem is receiving a message. The ring and load detector is constantly monitoring the telephone line 10 to determine if an incoming call ring has been received by the faxmodem (step 102) or if there is a line current on the telephone line (step 104). If there is no incoming call ring or line current, the ring detector continues to monitor for an incoming call or line current.

If an incoming call ring is detected (step 102), the ring detector checks for silence on the line for a specified period of time (step 106). If the silence continues for a time greater than a predetermined time-out period (step 108), it is taken as an indication that no additional ring has been received and the fax machine has either answered the call or the call has been terminated. Therefore, the faxmodem returns to the initial state and searches for a ring or line current. If the call was terminated, no ring will be detected and no line current exists, so the faxmodem remains in the initial condition. If no silence is heard, the device continues to wait for silence to determine whether any action is necessary (step 110).

If no ring is detected, but a line current exists (step 104), the call was answered and the faxmodem prepares to receive the fax handshake. The device waits for the CCITT fax handshake 122. If none is detected, the faxmodem continues to search for line current. If no line current is detected, it returns to the initial state. If the fax handshake is detected, the device enters the monitoring mode and waits for the CCITT V.21 signal containing set-up information known as a training sequence 124. The monitor mode is described in more detail in the discussion of FIG. 3 below.

In the situation where the fax machine receives an incoming call, but is unable to answer it due to an error, lack of paper, or other fault, there will be a series of call rings and the faxmodem device will automatically answer the call after a predetermined number of these rings. Once the first ring is detected (step 102), if a second ring is detected before the time-out period, a ring count is initiated (step 112). If the number of rings reaches a predetermined number (step 114) as programmed into the PC fax software by the user, the faxmodem goes "off-hook", answers the call, and instructs the switch to disconnect the second connector, thus removing the fax machine from the telephone line 10 (step 116). When the faxmodem answers the call, the faxmodem goes into standard faxmodem operation (step 118). Once the fax transmission is completed, the switch reconnects the second connector, thus reconnecting the tax machine to the telephone line (step 120).

If the local fax machine is transmitting a fax message, a ring signal is generated. Once the call is answered, a line current is generated and the faxmodem will enter the monitoring mode, as previously described.

FIG. 3 shows the monitoring process, including demodulating and decoding a non-standard format fax transmission. When the faxmodem detects the fax handshake signal, a fax-to-fax communication is indicated. Thus, the faxmodem switches to the monitoring mode and receives the V.21 signal (step 130). The V.21 signal is a training sequence sent by the receiving fax machine which conveys set-up information to the transmitting facsimile machine and includes timing information which varies according to the speed of the transmitted signal. The training sequence also has a fixed phase shift associated with the signal speed. After the training sequence is received, the faxmodem determines if either a Digital Command Signal (DCS) or Digital Transmit Command (DTC) has been detected (step 132). These signals provide the receiving speed and allow the faxmodem chip set to demodulate and decode the signals according to standard CCITT procedures (steps 134, 136).

If a DCS or DTC is not received, the faxmodem checks for a Non-Standard Setup Command (NSC) followed by Non-Standard Specifications (NSS) (step 138). A non-standard format transmission is indicated by following the non-standard frame with non-standard set-up conditions, which include several set-up options for fax transmission, including page transmission speed and page encoding scheme. As with all fax transmissions, to convert the signal into a fax image, it is necessary to demodulate and decode the signal. When a non-standard transmission is encountered, the faxmodem must determine the demodulation and decoding techniques used. The CCITT G.3 standards define three non-standard format fax transmission modulation norms: the CCITT V.27, V.29, and V.17 standards. Although each one of the norms may use more than one bit rate, these three standards use only two carrier frequencies, 1700 Hz and 1800 Hz. For all of these standards and speeds, before any data is transmitted, a different predefined modem training sequence is transmitted which starts with a number of known phase reversals and amplitudes. This training sequence is used for standard format and speed detection.

The information in the non-standard frame is compared to known non-standard information compiled in the DSP memory (step 140). Non-standard format information may be compiled by monitoring the transmissions between faxes of the same manufacturer. If the information matches a known NSS for a particular manufacturer, based on the non-standard frame speed and protocol, the proper demodulation technique and decode information is set (step 142). Once this information is set, the page information is received (step 146). The page encoding schemes are usually one or two dimensional, and can be converted to a standard format in a manner well known to those skilled in the art. If the page encoding scheme is neither one nor two dimensional, the information is converted to a bit map image and then encoded into either two- or one-dimensional fax data, as discussed below. Preferably, it is converted into one-dimensional data.

Figure 5:
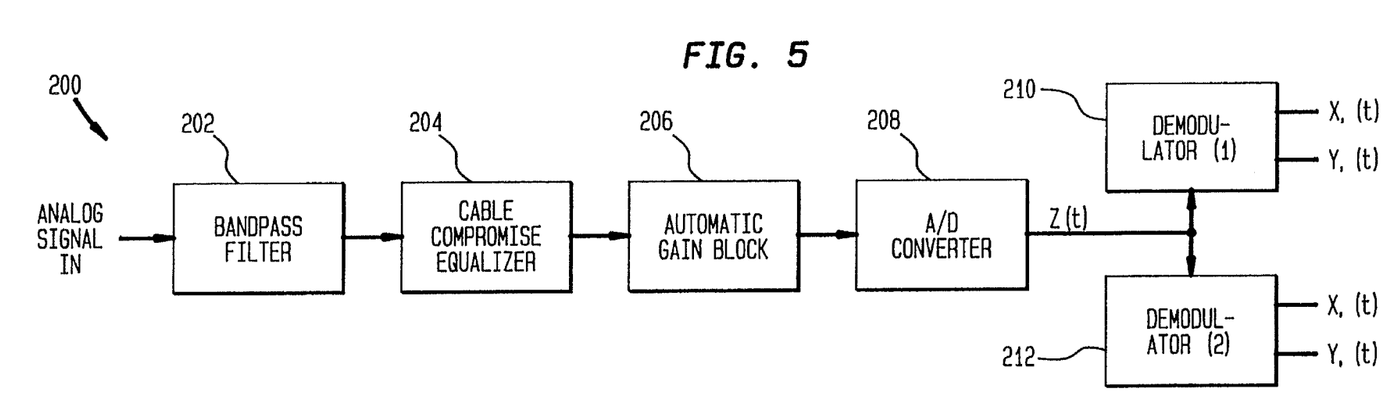
FIG. 5 is a block diagram of the non-standard fax speed detection decoder.
Figure 6:
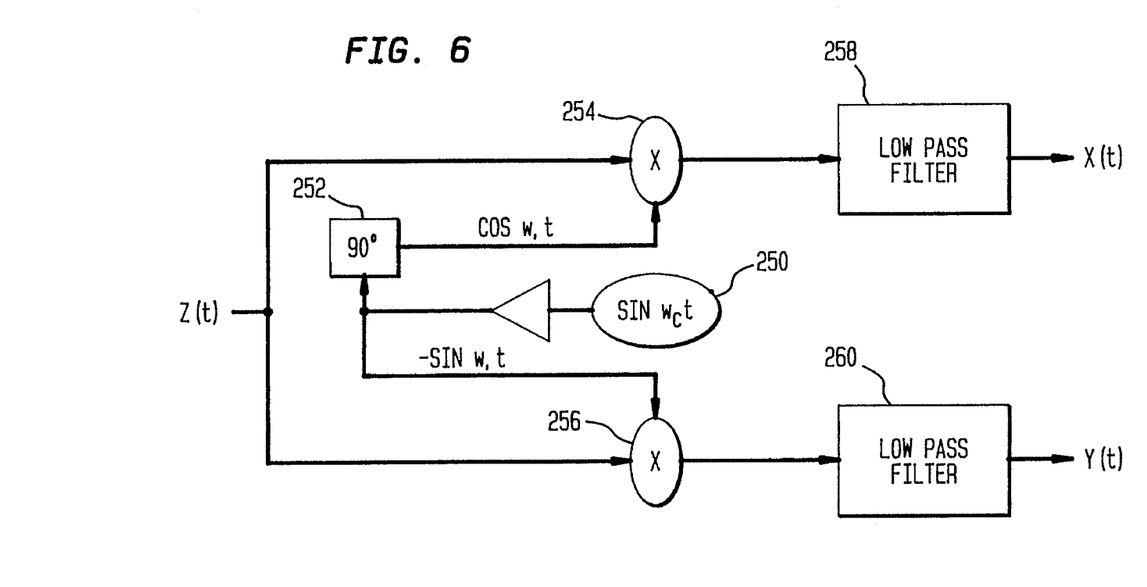
FIG. 6 is a block diagram of a quadrature demodulator used in the non-standard fax speed detection decoder and FIG. 7 is a diagram showing V.27 4800 bps Segment 3 Eye Pattern.

If the NSS does not match any of the information stored in the DSP library (step 140), the carrier frequency can be determined by using two quadrature demodulators in parallel connection, one for demodulating 1700 Hz signals, and one for demodulating 1800 Hz signals. Once demodulated, the signals can be compared with information stored in the DSP and a decision on format and speed can be made by determining a "best fit" with information in the DSP 144. FIGS. 5 and 6 explain how this demodulation is achieved. Once the "best fit" is determined, the page information is received (step 146). The page information is then converted into standard facsimile format (step 150).

FIG. 5 shows a block diagram of a non-standard format fax speed detection decoder 200. Before the signal is received by the quadrature demodulators, it is processed so that it can be converted from analog to digital form. This may be done in any suitable manner. Preferably, a portion of the fax signal that is output by the high impedance transformer 42 is fed into a band pass filter 202 to eliminate signals outside of the desired frequency band. The output of the band pass filter is then fed through a cable compromise equalizer 204, which reduces the transmission line amplitude distortion. The cable compromise filter output is fed to an automatic gain block 206, which compensates for the different receiving levels and keeps the signal at an optimum level, e.g., adjusts the signal amplitude to the optimum level of the circuit. The signal is then sampled at a fixed rate, which is a multiple of the baud rate. This signal is then converted from analog to digital by an A/D convertor 208. The digitized sample of the signal from the telephone line is then fed to two quadrature demodulators 210, 212. The local sine wave oscillators of these demodulators run at 1700 Hz and 1800 Hz, respectively. The demodulators are shown in more detail in FIG. 6.

The quadrature demodulators of FIG. 6 operate as follows. The signal $Z(t)$ is multiplied with $\cos w_c t$ and $-\sin w_c t$ where $w_c$ is 1700 Hz and 1800 Hz for demodulators 210 and 212, respectively.

If the signal $Z(t)$ is defined as:

$$Z(t) = x \cos w_c t - y \sin w_c t$$

then the output of the Sine multiplier 256 is:

$(x \cos w_c t - y \sin w_c t)(-\sin w_c t) =$
$\quad (½) [y - x \sin 2w_c t - \cos 2w_c t] = y/2 + \text{2nd harmonic of } w_c$ The output of the sine wave oscillator 250 is phase shifted 90° by phase shifter 252 to change it to a Cosine wave. The output of the Cosine multiplier 254 is:

$(x \cos w_c t - y \sin w_c t) \cos xw_c t =$
$\quad (½) [x + x \cos 2w_c t y - \sin w_c t] = x/2 + \text{2nd harmonic of } w_c$ The second harmonic terms are removed from the multiplier outputs by low pass filters 258, 260.

Figure 7:
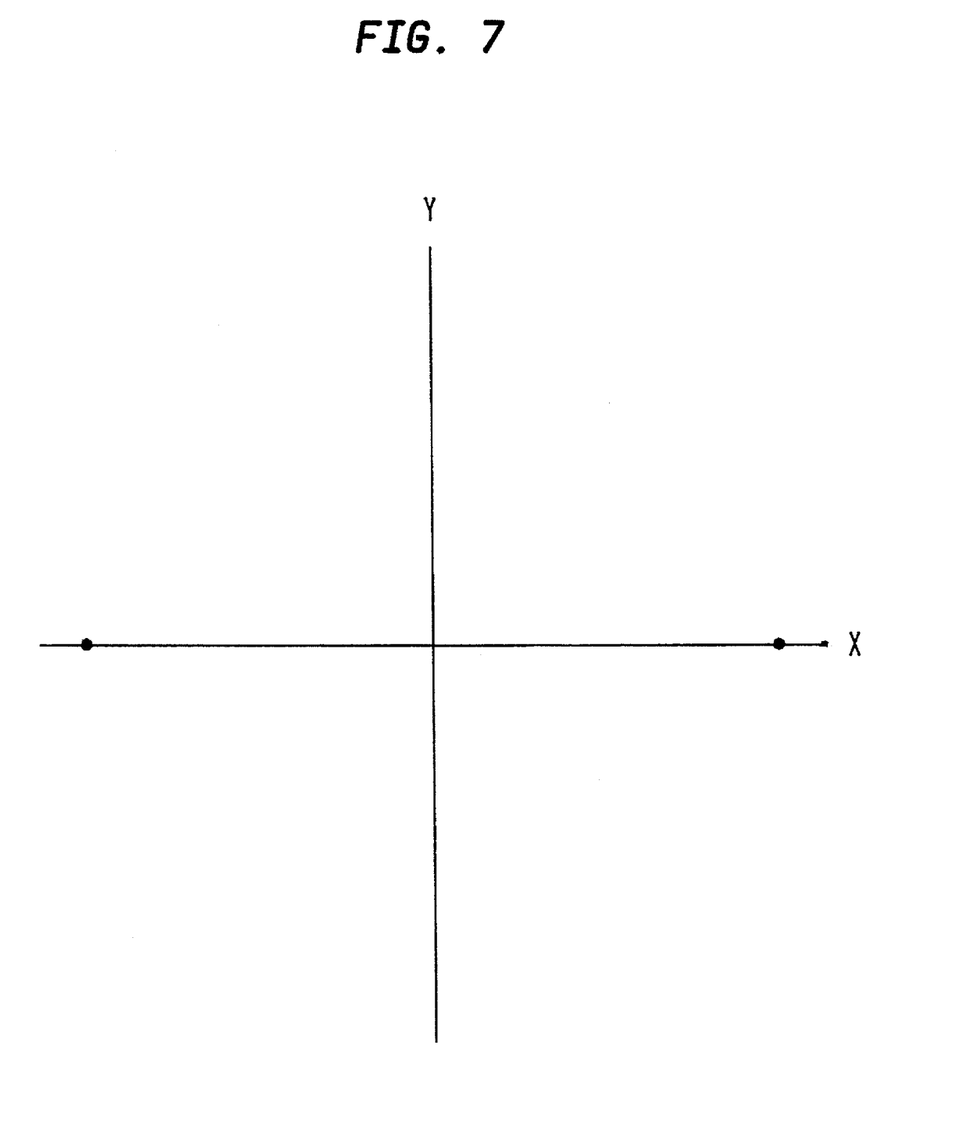

The outputs $X(t)$ and $Y(t)$ of the demodulators are the coordinates of the vectors in the Eye Pattern diagram at sample times. FIG. 7 shows a V.27 4800 bps Segment 3 Eye Pattern. For a receiving facsimile machine to train on the transmitted training sequence, the receiving facts must recognize a prescribed sequence of symbols which cause the receiver to enter the training state. An alternating 180° pattern as shown in FIG. 7 triggers the detector. This sequence is referred to as Period 2 because a pattern repeats every 2 symbols. FIG. 7 shows the Eye Pattern of a transmitted signal for the P2 sequence. From these vectors, the phase changes between the two sample points and the amplitude of the input signal to the 1700 Hz and 1800 Hz signals of the demodulator can be calculated. The DSP compares the demodulated outputs with information in the DSP's memory tables which contain predetermined phase changes and amplitudes of training sequences for every speed and format, and several line conditions which may effect the phase changes and amplitudes. By finding the best fit of the recorded phase changes and amplitudes with the information contained in the table, it can be determined with reasonable accuracy at what speed and format the signal is sent. Once this determination is made, the modem is set and trained for the determined speed and format, and the data passing through the line is demodulated.

The NSS detector 200 is shown in FIG. 1 as being in the faxmodem chip set 46. A typical commercially available faxmodem chip set such as the Rockwell 96 DFX includes a single quadrature demodulator as shown in FIG. 6 for demodulating incoming signals at the speed designated in the V.21 signal. The faxmodem chip set 46 may be modified to have the second quadrature demodulator 212 in parallel connection with a first quadrature demodulator 210 in order to operate as a non-standard format fax speed detection decoder. Alternatively, the second quadrature demodulator may be located in the DSP 50. A third alternative is to use the single quadrature demodulator found in the commercially available chip set and arrange the software in the program memory 56 to sample the processed signal $Z(t)$ at both 1,700 Hz and 1,800 Hz, thus, accomplishing the same result without additional hardware.

Yet another alternative, which also requires no additional hardware, is to sample all incoming signals at one frequency, i.e., 1,700 Hz or 1,800 Hz, and compare the "demodulated" signals with information stored in the DSP library. In this embodiment, the DSP library stores the outputs of the signals properly demodulated at the correct speed and improperly "demodulated" at the incorrect speed. For example, if the signals were demodulated or sampled at 1,700 Hz, the DSP library would contain information identifying the outputs of properly demodulated 1,700 Hz signals and improperly demodulated 1,800 Hz signals. This information can be compiled and stored by demodulating known facsimile signals of both speeds at the desired frequency and storing the output. The comparison seeks a "best fit" to be used to make a decision determining the proper format and speed of the non-standard signal.

Once the signal is demodulated, it must be decoded. FIG. 4 is a flow chart of the process for convening page information into standard facsimile format, which is step 150 of FIG. 3. The faxmodem determines the page encoding scheme of the demodulated facsimile signal (step 152) from information contained in the V.21 handshake signal. If the encoding scheme is one- or two-dimensional, the page information is decoded according to standard decoding procedures (step 154). If the page information is encoded according to some other scheme, the DSP 50 converts the page information into a bit map image (step 156). The bit map is then encoded into a form which can be convened into standard facsimile format (step 158). Preferably, the bit map is encoded into one-dimensional data. To conserve memory space, the conversion may be performed in intervals, for example, by convening ten lines at a time.

Once the signal is demodulated and decoded, the standard fax message may be handled by the computer or network server 80 as any fax message. For example, the computer may use conventional, well known methods to convert the fax message into text which may be sent to a paging network or further converted into a voice signal and relayed over either a wired or wireless communication systems.

Prior art faxmodems operate as receiving fax machines which "train" the sending fax to transmit information in a manner which the receiving fax "understands." The present invention must be able to "understand" the transmission regardless of the transmission format used, even if it is a non-standard format. The device must be capable of this, even if new non-standard formats develop in the future.

Thus, the present invention has a number of advantages over the prior art. The device has the ability to retain copies of outgoing and incoming facsimile transmissions to and from the conventional fax machine, preferably in real time, without additional manual steps or hardware. The device may be modified to use a polling algorithm which will enable simultaneous use of several lines, with one card per line in a single computer. The device has the ability to answer calls to the fax machine should the fax machine fail to answer. The device has means for detecting and decoding non-standard fax transmission speed.

The device prevents unauthorized use because copies can only be made if the faxmodem device 30 is serially connected between the telephone line 10 and fax machine 20. Thus, the device cannot allow tapping of telephone lines, or illegal interceptions of faxed information.

While the invention has been particularly shown and described with reference to preferred embodiments thereof, it will be understood by those skilled in the art that various changes in form and details may be made therein without departing from the spirit and scope of the invention.

We claim:

1. A facsimile modem device comprising:

means for passing a facsimile data signal from a telephone line to a local fax machine;

a high impedance connected to said means for passing the facsimile data signal and configured to divert a sample signal related to said facsimile data signal without significantly affecting the facsimile data signal simultaneously passing to the local fax machine;

a non-standard format demodulator, including:
   a. an input connected to the high impedance and connected to receive a portion of the facsimile signal received by the facsimile demodulator;

b. a signal processor connected to the input and configured to convert the signal to a digital signal;

c. at least two quadrature demodulators in parallel connection with an output of the signal processor, each quadrature demodulator having a different demodulation frequency;

d. a memory containing predetermined demodulation information; and e. a comparator connecting the quadrature demodulators and the memory, the comparator connected to compare an output of the quadrature demodulators and the predetermined demodulation information;

a decoder connected to receive the demodulated signal and produce a fax image signal; and an output connected to the decoder and configured to output the fax image to a computer.

2. The facsimile modem device of claim 1, wherein said means for passing comprises a first connector attached to the telephone line, a second connector connected to a line leading to the fax machine and a switch for selectively connecting the first and second connectors together.

3. The facsimile modem device of claim 2, wherein the switch is a switch relay bank.

4. The facsimile modem device of claim 1, wherein the high impedance is a transformer having a ratio of 6:1.

5. The facsimile modem device of claim 1, wherein the output is a computer interface.

6. A non-standard format facsimile decoding device, comprising a. an input for receiving at least a portion of a facsimile signal;

b. a signal processor connected to the input for converting the signal to a digital signal;

c. at least two quadrature demodulators in parallel connection with the signal processor, each quadrature demodulator having a different demodulation frequency;

d. a memory containing predetermined demodulation information; and e. a comparator connected to the quadrature demodulators and the memory, comparator means comparing an output of the quadrature demodulators with the predetermined demodulation information.

7. A facsimile modem device comprising:

a. means for passing a facsimile data signal from the telephone line to a local fax machine;

b. a high impedance connected to said means for passing the facsimile data signal and configured to pass a sample signal related to said facsimile data signal without significantly affecting the facsimile signal;

c. a facsimile processor connected to said high impedance for demodulating and decoding the sample signal in order to produce facsimile image information, the processor including:
   (i) a demodulator connected to said high impedance for demodulating the sample signal to produce a demodulated signal; and
   (ii) a decoder connected to receive said demodulated signals and produce a fax image signal;

d. the demodulator further including a non-standard format demodulator having;
   (i). an input connected to the high impedance for receiving a portion of the facsimile signal received by the facsimile demodulator;
   (ii). a signal processor connected to the input for converting the signal to a digital signal;

(iii). at least two quadrature demodulators in parallel connection with an output of the signal processor, each quadrature demodulator having a different demodulation frequency;

(iv). a memory containing predetermined demodulation information; and (v). a comparator connecting the quadrature demodulators and the memory, the comparator comparing an output of the quadrature demodulators with the predetermined demodulation information; and e. an output for transmitting said fax image information to a computer.

8. A method for determining the non-standard demodulation technique of a facsimile signal, comprising the steps of:

a. passing a sample of the facsimile signal from a line connected to a local facsimile to a line connected to a fax modem;

b. determining that a non-standard demodulation technique is employed by the local facsimile machine;

c. demodulating the sample of the facsimile signal at two different frequencies:

d. comparing the demodulated signals with predetermined demodulation technique information; and e. selecting a demodulation technique based on the comparison.

9. The method of claim 8, wherein the step of selecting further includes selecting the demodulation technique based on a best fit determined by the comparison.

10. The method of claim 8, further comprising the step of converting the signal from an analog to a digital signal before the step of demodulating.

11. The method of claim 8, wherein the step of demodulating further comprises:

a. feeding a portion of the facsimile signal into a first quadrature demodulator having a first demodulation speed; and b. feeding a portion of the facsimile signal into a second quadrature demodulator having a different second demodulation speed.

12. The method of claim 11, wherein the step of feeding a portion of the facsimile signal into the first quadrature demodulator further includes the following steps:

a. generating a first demodulation signal in the first quadrature demodulator at the first demodulation speed;

b. splitting the first demodulation signal into a first and second multiplier signal;

c. phase shifting the second multiplier signal;

d. applying the first multiplier signal and the phase shifted second multiplier signals to first and second multipliers, respectively, wherein the facsimile signal is multiplied by the first multiplier signal and the phase shifted second multiplier signals; and e. applying an output of the first and second multipliers to respective low pass filtering means.

13. The method of claim 11, wherein the step of feeding a portion of the facsimile signal into the second quadrature demodulator further includes the following steps:

a. generating a second demodulation signal in the second quadrature demodulator at the second demodulation speed;

b. splitting the second demodulation signal into a third and fourth multiplier signal;

c. phase shifting the fourth multiplier signal;

d. applying the third multiplier signal and the phase shifted fourth multiplier signals to third and fourth multipliers, respectively, wherein the facsimile signal is multiplied by the second multiplier signal and the phase shifted fourth multiplier signals; and e. applying an output of the third and fourth multipliers to respective low pass filtering means.

14. A method for determining the non-standard demodulation technique of a facsimile signal, comprising the steps of:

a. demodulating a facsimile signal at two different frequencies, including;

i. feeding a portion of the facsimile signal into a first quadrature demodulator having a first demodulation speed; and ii. feeding a portion of the facsimile signal into a second quadrature demodulator having a second demodulation speed:

b. comparing the demodulated signals with predetermined demodulation technique information; and c. selecting a demodulation technique based on the comparison.

15. The method of claim 14, wherein the step of selecting further includes selecting the demodulation technique based on a best fit determined by the comparison.

16. The method of claim 14, wherein the step of feeding a portion of the facsimile signal into the first quadrature demodulator further includes the following steps:

a. generating a first demodulation signal in the first quadrature demodulator at the first demodulation speed;

b. splitting the first demodulation signal into a first and second multiplier signal;

c. phase shifting the second multiplier signal;

d. applying the first multiplier signal and the phase shifted second multiplier signals to first and second multipliers, respectively, wherein the facsimile signal is multiplied by the first multiplier signal and the phase shifted second multiplier signals; and e. applying an output of the first and second multipliers to respective low pass filtering means.

17. The method of claim 14, wherein the step of feeding a portion of the facsimile signal into the second quadrature demodulator further includes the following steps:

a. generating a second demodulation signal in the second quadrature demodulator at the second demodulation speed;

b. splitting the second demodulation signal into a third and fourth multiplier signal;

c. phase shifting the fourth multiplier signal;

d. applying the third multiplier and the phase shifted fourth multiplier signals to third and fourth multipliers, respectively, wherein the facsimile signal is multiplied by the second multiplier signal and the phase shifted fourth multiplier signals; and e. applying an output of the third and fourth multipliers to respective low pass filtering means.

* * * * *